O. NEWMAN.
MOLDING DEVICE.
APPLICATION FILED OCT. 5, 1916.
1,268,046.
Patented May 28, 1918.
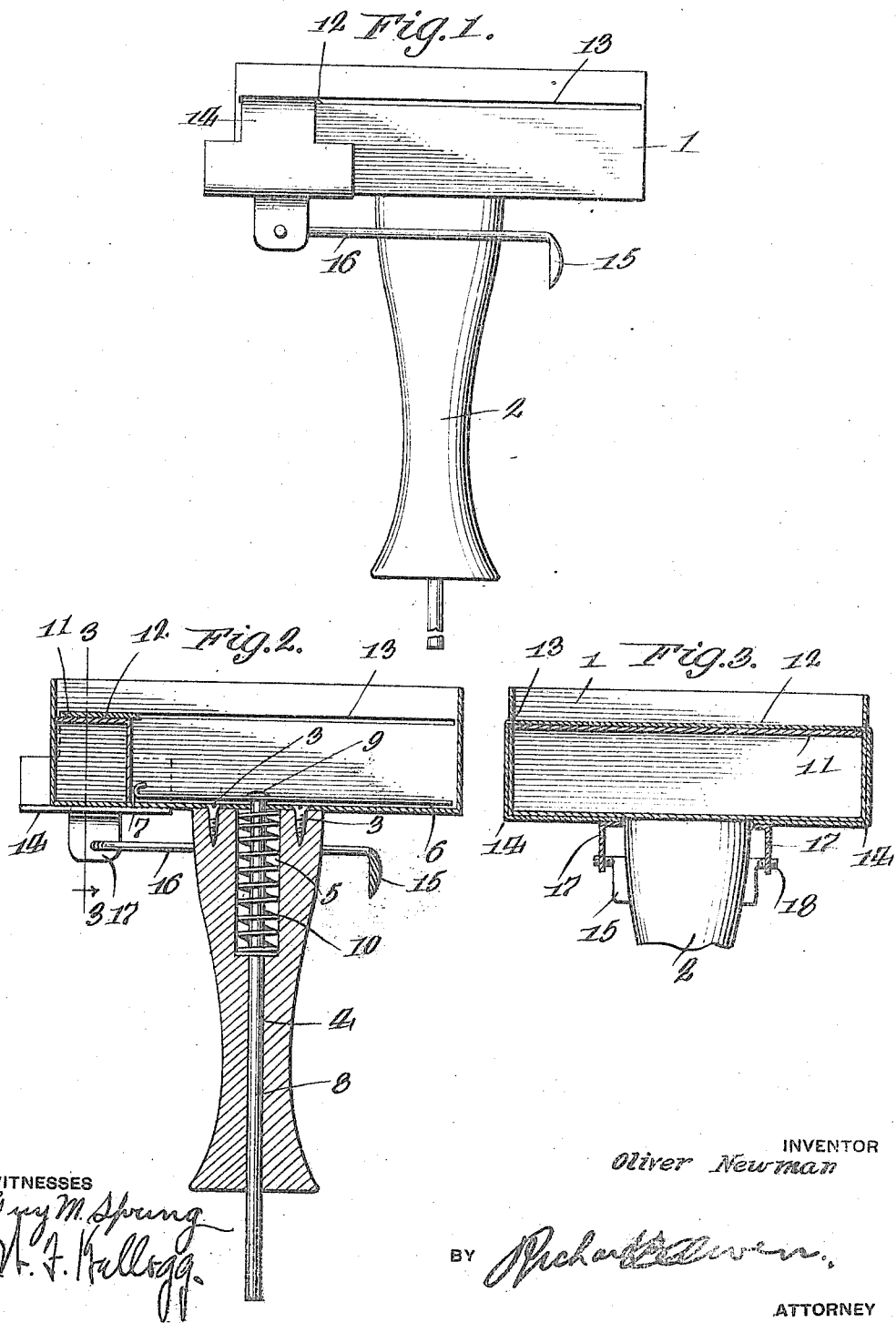
INVENTOR
Oliver Newman
WITNESSES
BY
ATTORNEY

UNITED STATES PATENT OFFICE.

OLIVER NEWMAN, OF MADRID, IOWA.

MOLDING DEVICE.

1,268,046.

Specification of Letters Patent.

Patented May 28, 1918.

Application filed October 5, 1916. Serial No. 123,907.

*To all whom it may concern:*

Be it known that I, OLIVER NEWMAN, a citizen of the United States, residing at Madrid, in the county of Boone and State of Iowa, have invented certain new and useful Improvements in Molding Devices, of which the following is a specification.

My invention relates to confectioners' appliances, and, the invention has more particular reference to an improved molding device for frozen delicacies.

The invention has for its principal object to provide an article for molding "ice cream sandwiches," whereby, the use of a scoop or other implement with which to fill the mold, is eliminated, the device rendering it possible to efficiently form one of these so-called sandwiches in a minimum amount of time, by combining the features of a scoop with the mold, thus, facilitating the operation, generally.

As an object of equal importance, the invention aims to provide a novel means for removing any surplus of ice cream which may remain within the mold subsequent to its removal from the ice cream container.

Still further, the invention embodies means for ejecting the sandwich when completed, thereby, enabling the user of the mold to readily serve the same.

Among other objects of the invention may be recited, the provision of a device of the character mentioned with a view to compactness, and in which the number of parts are few, the construction simple, the cost of production small, and efficiency and operation high.

Other and further improvements and novel details in the construction and arrangement of parts will be appreciated from the description to follow, which for a clear understanding of the invention should be considered in connection with the accompanying drawings, forming a part hereof and wherein the preferred embodiment of the invention is shown for the purpose of illustration.

In the drawings:

Figure 1 is a side elevation of the improved mold,

Fig. 2 is a longitudinal section therethrough in elevation, and

Fig. 3 is a transverse section taken on the line 3—3 of Fig. 2.

With more particular reference to the drawings, wherein like reference numerals refer to corresponding parts throughout the several views, the improvements may be said to embody a molding and wafer receiving receptacle 1 which is of substantially rectangular shape. A handle 2 is secured to the bottom of the receptacle by means of screws 3 and has formed therethrough a longitudinally disposed bore 4, the upper portion of which is enlarged, as at 5, the purpose of which will be presently apparent.

A second or movable bottom 6, having one end thereof up-turned, as indicated at 7 is arranged within the receptacle 1 and is of less length than the same. To support the bottom 6, a rod 8 is passed through the longitudinal bore 4 of the handle and extends below the lower extremity thereof, the upper end of the rod being mush-roomed, as at 9, in order that the said bottom may be securely connected therewith.

To normally retain the secondary bottom 6 in a position adjacent the bottom of the receptacle 1, a contractile coiled spring 10 is arranged within the enlarged bore 5 and has the lower extremity thereof secured to the adjacent portion of the rod 8, while the remaining or upper extremity bears upon the bottom of the receptacle 1. Thus, it is obvious that the secondary bottom 6 will by reason of the contractibility of the spring 10 be retained in position adjacent the receptacle bottom. The construction thus far described, provides for the ice cream molding means and the scoop whereby the desired amount may be removed from the container.

With a view toward providing means whereby any surplus of ice cream as remaining within the receptacle 1 may be removed subsequent to its withdrawal of the container, a shelf 11 is arranged at one end of the receptacle 1 and normally supports a slidable knife 12. Corresponding horizontally arranged slots 13 are formed within the sides of the receptacle 1 and afford guide ways for the knife 12 during movement thereof. Right angularly bent side portions 14 are formed upon the opposite extremities of the knife 12 and are received within the corresponding slots 13 and offer means for retaining the knife 12 in proper position during movement thereof and prevent undue vertical movement of the same. To draw the knife through the slots 13, a handle 15 having side arms 16 is engaged with angular pieces 17 secured to the under faces of the right angularly bent portions 14, adjacent the extremities thereof, it being noted that the ends of the arms 16 are bent outwardly, as at 18 and then engaged with suitable openings formed in the lower ends of the pieces 17.

In operation, the handle 2 is grasped and a wafer is then placed upon the movable bottom 6, whereupon the receptacle 1 is engaged with the bulk of ice cream and a sufficient amount thereof forced into the said receptacle. At this point, the receptacle is withdrawn and should any surplus of ice cream be contained by the receptacle, the knife 12 is moved horizontally thereof by means of the handle 15, consequently, removing the surplus and evenly distributing the delicacy. A second wafer is now placed upon the ice cream and the rod 8 forced upwardly against the tension of the spring 10, which movement will cause the completed sandwich to be partially ejected from the mold, thereby, enabling the user of the device to readily serve the same. When the rod 8 is released, the movable bottom 6 will be returned to its normal position by means of the spring 10 and the construction then rendered ready for further usage.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

I claim:

1. In a molding device of the class described, the combination of a receptacle, a handle secured to said receptacle, said receptacle having alined slots, extending longitudinally thereof, a flat knife projecting through said slots, parallel bent portions extending from the ends of said knife, said bent portions extending around under said receptacle, whereby said knife will be held against displacement, and means for moving said knife longitudinally of said slots.

2. In a molding device of the class described, the combination of a receptacle having alined slots, a handle secured to said receptacle, a flat knife projecting through said slots, said knife being bent at its ends to have parallel bent portions said bent portions terminating in angular portions fitting under said receptacle, thereby holding said knife against displacement, inverted L shaped pieces secured to said angular portion, a handle having arms connected to said pieces, whereby said last mentioned handle may move said pieces for causing said bent portions to move said knife longitudinally of said slots.

3. In a molding device of the class described, the combination of a receptacle, a handle secured to said receptacle, said receptacle having alined slots extending longitudinally thereof, a flat knife projecting through said slots, parallel bent portions extending from the ends of said knife, said bent portions extending around under said receptacle, whereby said knife will be held against displacement, means for moving said knife longitudinally of said slots, and means positioned below said knife for preventing the packing of ice-cream under said knife.

4. In a molding device of the class described, the combination of a receptacle, a handle secured to said receptacle, said receptacle having alined slots extending longitudinally thereof, a flat knife projecting through said slots, a shelf carried beneath said knife for preventing the packing of ice-cream thereunder, parallel bent portions extending from the end of said knife, said bent portions extending around under the receptacle, whereby said knife will be held against displacement, and means for holding said knife to move longitudinally of said slot.

In testimony whereof I affix my signature in presence of two witnesses.

OLIVER NEWMAN.

Witnesses:
 FLOYD ALSIN,
 C. A. ALSIN.

Copies of this patent may be obtained for five cents each, by addressing the "Commissioner of Patents, Washington, D. C."